United States Patent [19]

Nord

[11] 4,158,343
[45] Jun. 19, 1979

[54] COATER

[75] Inventor: Eric T. Nord, Oberlin, Ohio

[73] Assignee: Nordson Corporation, Amherst, Ohio

[21] Appl. No.: 939,766

[22] Filed: Sep. 5, 1978

Related U.S. Application Data

[63] Continuation-in-part of Ser. No. 837,328, Sep. 27, 1977, abandoned.

[51] Int. Cl.$^2$ ............................ B05B 1/28; B05B 3/00
[52] U.S. Cl. ..................................... 118/315; 118/323; 118/326
[58] Field of Search ............... 118/315, 323, 326, 321; 427/421, 422, 424–427

[56] References Cited

U.S. PATENT DOCUMENTS

| | | | |
|---|---|---|---|
| 1,327,973 | 1/1920 | Allen | 118/315 |
| 2,719,529 | 10/1955 | Wells | 118/323 X |
| 2,848,353 | 8/1958 | Norris | 118/326 X |
| 2,894,485 | 7/1959 | Sedlacsik, Jr. | 118/323 X |
| 3,438,803 | 4/1969 | Dubble et al. | 118/315 X |
| 3,568,638 | 3/1971 | Isaac | 118/323 |
| 3,594,228 | 7/1971 | Mock | 118/315 X |
| 3,814,322 | 6/1974 | Waldrum | 118/323 X |

*Primary Examiner*—Morris Kaplan
*Attorney, Agent, or Firm*—George J. Coghill

[57] ABSTRACT

A machine for the coating of a strip material substrate, flat stock or the like has a plurality of spray coating guns applying coating material to the substrate. A sloping ceiling and nozzle support assembly causes any coating material deposited thereon to flow along these surfaces to the side of the substrate rather than collecting above the substrate and dripping on the substrate and degrading the desired finish. In a rotary coater, the sloping ceiling and nozzle support assembly can be combined into one rotating structure wherein centrifugal force arising from the rotation of the structure causes any coating material deposited on it to travel to its outer rotating edge where it is thrown clear of the substrate. Troughs over the entrance and exit openings of the coater collect coating material which would otherwise drip onto the substrate from above the openings and carry such coating material clear of the substrate.

15 Claims, 2 Drawing Figures

COATER

FIELD OF THE INVENTION

This is a continuation-in-part of Application Ser. No. 837,328 filed Sept. 27, 1977, now abandoned.

This invention relates to coating machines, and more particularly relates to the prevention of drips from the ceiling and spray nozzle mounting brackets of the coating chamber onto the substrate to be coated.

BACKGROUND OF THE INVENTION

There are many forms of coating systems in use today. One such a system is known as a continuous coater. The continuous coater is a machine which usually employs a plurality of spray coating nozzles which atomize coating material and project it onto a substrate in an effectively closed coating chamber, except for entrance and exit openings for the substrate to pass into and out of the coating zone. For coating the top side of flat stock or the like the nozzles are sometimes disposed in a horizontal circular pattern and made to rotate about a vertical axis central to the circularly disposed pattern of the spray guns. Other coaters have fixed nozzles directed at the substrate to be coated.

Not all of the coating material in these systems is deposited on the substrate due to various factors. Therefore, some coaters maintain a solvent-rich atmosphere in the coating chamber. The solvent-rich atmosphere prevents the "oversprayed" material deposited on the interior of the coating chamber from drying and forming a build up which would be difficult if not impossible to clean. Because of the solvent-rich atmosphere any coating material deposited on the walls, ceilings or floors remains in a liquid state and can be made to run into a drain and collected. Generally it can be recycled into the coating system. Any residual coating material which does adhere to the interior of the chamber can easily be washed out by means of a garden hose type solvent rinse. However, these coating systems did have disadvantages. One of these disadvantages exists in the fact that the coating material could become deposited on the interior of the coating chamber or nozzle support structure above the substrate, could collect and eventually drip onto the substrate. These drips degrade the finish.

The present invention deals with this problem of dripping. In a preferred embodiment the interior of the coating chamber is provided with a rotating ceiling section having a generally horizontally oriented outer rotating edge portion. Centrifugal force created by the rotation of the ceiling section causes the coating material deposited on it to travel to its outer rotating edge where the coating material can be thrown clear of the substrate to be coated.

In the preferred embodiment of this invention the ceiling has a central portion with a generally conically shaped underside surface sloping downwardly from the axis of rotation. The underside surface can be made to have a slope which diminishes in relation to an increase in the radial distance from the axis of rotation.

The plurality of spray coating nozzles have been advantageously mounted directly onto the rotating ceiling. Thus, as the ceiling rotates, so also do the spray nozzles rotate by means of a common drive assembly. This provides a desired coating pattern wherein each of the spray nozzles coats the substrate in an overlapping pattern with respect to adjacent nozzles due to constant movement of the substrate under the nozzles in the coating chamber. This arrangement also allows the mechanical and hydraulic hardware associated with the nozzles to be located above and be protected by the ceiling.

The ceiling is preferably made circular with a rotating diameter larger than the width of the substrate passing through the coating chamber, so as to assure that the coating material will be thrown clear of the substrate.

Troughs are provided over the entrance and exit openings. These troughs divert and carry to the side of the substrate any coating material thrown off the rotating ceiling or deposited on the side wall over the openings.

A small amount of negative pressure can be applied to the coating chamber so that a small flow of air is drawn downwardly between the outer edge of the ceiling and the side walls of the coater. This small amount of air prevents the spray droplets contained in the atmosphere of the coating chamber from entering the area above the rotating ceiling.

In another embodiment of the invention the ceiling can be made stationary although still having a downwardly sloping underside surface. In such a case any additional support structure needed for the nozzles is made to slope downwardly or at least have an underside surface which slopes downwardly off to the side of the substrate path.

BRIEF DESCRIPTION OF THE DRAWINGS

The invention can be more fully appreciated by reference to the following description of the preferred embodiment and the drawing figures in which.

DESCRIPTION OF THE PREFERRED EMBODIMENT

Figure 2:
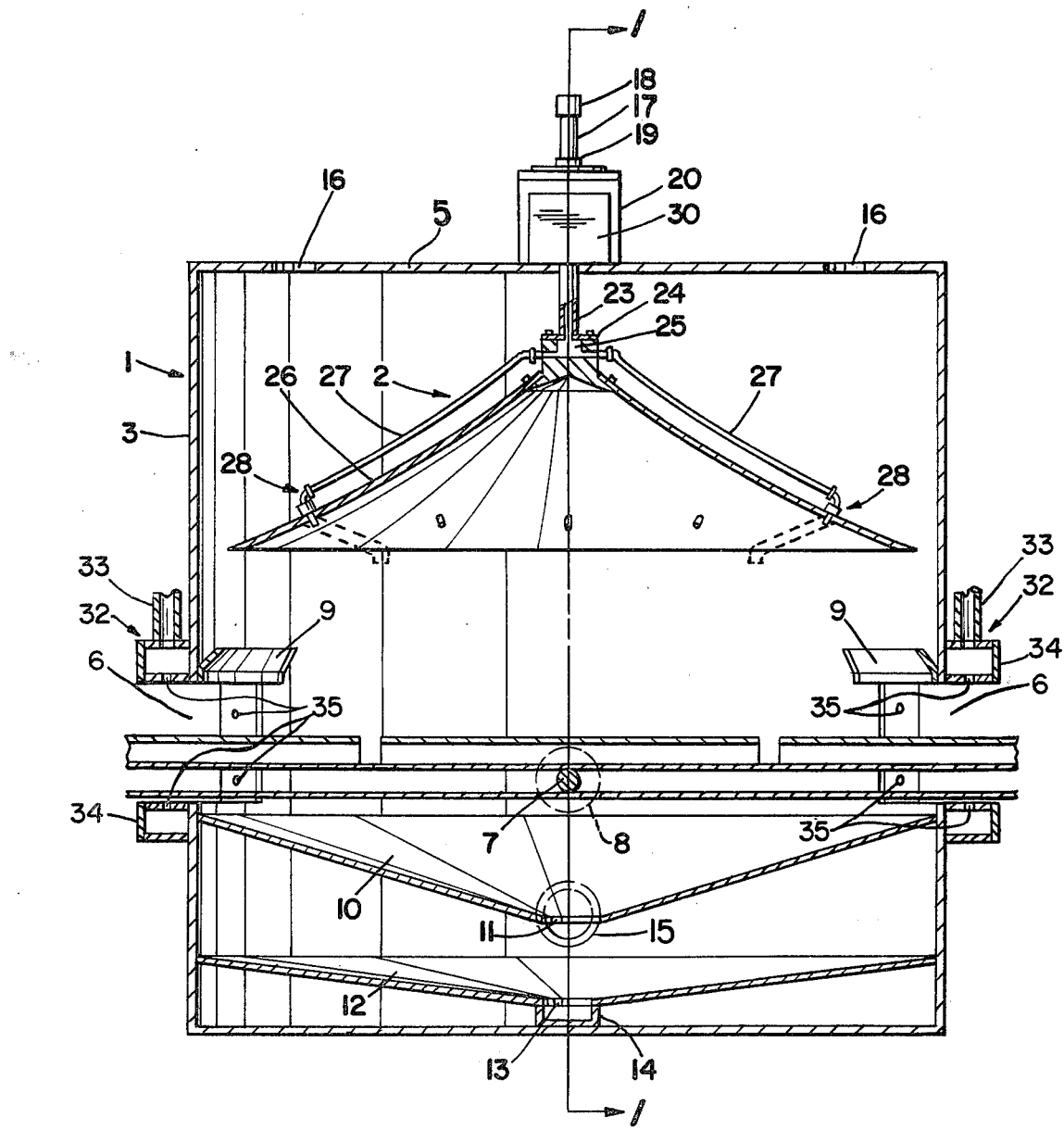
FIG. 2 is a partially cross sectional view of the coater taken on a plane parallel to the direction of travel of the substrate through the coater, on line 2—2 in FIG. 1.

Referring first to FIG. 2 the general layout of the coater can be seen. The coater is generally cylindrical in shape having a cylindrical side wall 3 and circularly shaped roof or top section 5. Diametrally opposed openings 6 in the side wall 3 allow a strip substrate (not numbered) to be conveyed through the coater.

Located above the substrate path is a spray-nozzle/ceiling assembly 2. The spray-nozzle/ceiling assembly 2 is supported by and is supplied with pressurized coating material by a hollow rod 17 rotatably suspended from the roof 5. At the lower end of the rod 17 is a manifold 24 which supports the spray-nozzle/ceiling assembly 2. The interior of the manifold 24 contains a chamber 25 which communicates with an interior passage 23 of the hollow rod 17. The chamber 25 receives hydraulically pressurized coating material from the passage 23 in the hollow rod 17 and distributes the coating material to the spray nozzles 28 through supply lines 27. The nozzles are mounted on a rotating ceiling 26 in an equally spaced circular pattern around the outer portion of the ceiling 26, and are aimed in a generally downward direction. Hence, the ceiling also constitutes the support structure for the nozzles. The tips (not numbered) of three additional nozzles hidden by the ceiling 26 are shown at the rear of the ceiling 26.

The ceiling 26 is made to rotate above the substrate. It has a generally horizontally disposed outer rotating edge and is circular in horizontal cross section. The ceiling 26 is made so as to have an underside surface which slopes downwardly from its central axis of rotation about the hollow rod 17. The slope of the ceiling 26 diminishes in relation to an increase in the axial distance from the axis of rotation. The slope of the ceiling 26 does not necessarily have to be diminished at the outer extremities, however, the diminishing slope allows a reduction in the overall height of the ceiling for a given diameter. The diminishing slope can be incorporated however, due to the fact that centrifugal force increases in relation to distance from an axis of rotation. Therefore, there is more force normal to the underside surface of the ceiling 26 to hold the coating material to it at its outer extremities than at the inner portions. Thus, due to the increased centrifugal force at the outer extremities, the slope need not be so great at the outer extremities to prevent dripping.

The ceiling 26 is mounted to the manifold 24, such that the underside surface of the manifold 24 completes the structure of the ceiling 26 at the center. Accordingly, the underside surface of the manifold 24 is also made to have a downwardly sloping underside surface, and in particular is conically shaped.

The hollow rod 17 passes through a hole in the roof 5 and is supported by a thrust/radial bearing 22 secured to the outside of the rod 17 and to the roof 5. A sprocket drive assembly 21 is secured to the outside of the rod 17 and rotational force is provided by means of a motor 30 and transmission 31 connected to the sprocket drive 21 on the rod 17 by means of a drive chain 29.

Stability and additional support for the rotating assembly is provided by means of a housing 20 secured to the roof 5 and rotationally connected to the rod 17 by means of a second bearing 19.

The end of the hollow rod 17 extending out of the coater and housing 20 is provided with a hydraulic fitting 18 having a rotary seal. Such devices are well known in the art and the details of it are not discussed herein. Thus, coating material is fed from a pressurized supply of coating material (not shown) to the passage 23 in the hollow rod 17, to the manifold chamber 25 and thence to the spray nozzles 28.

Figure 1:
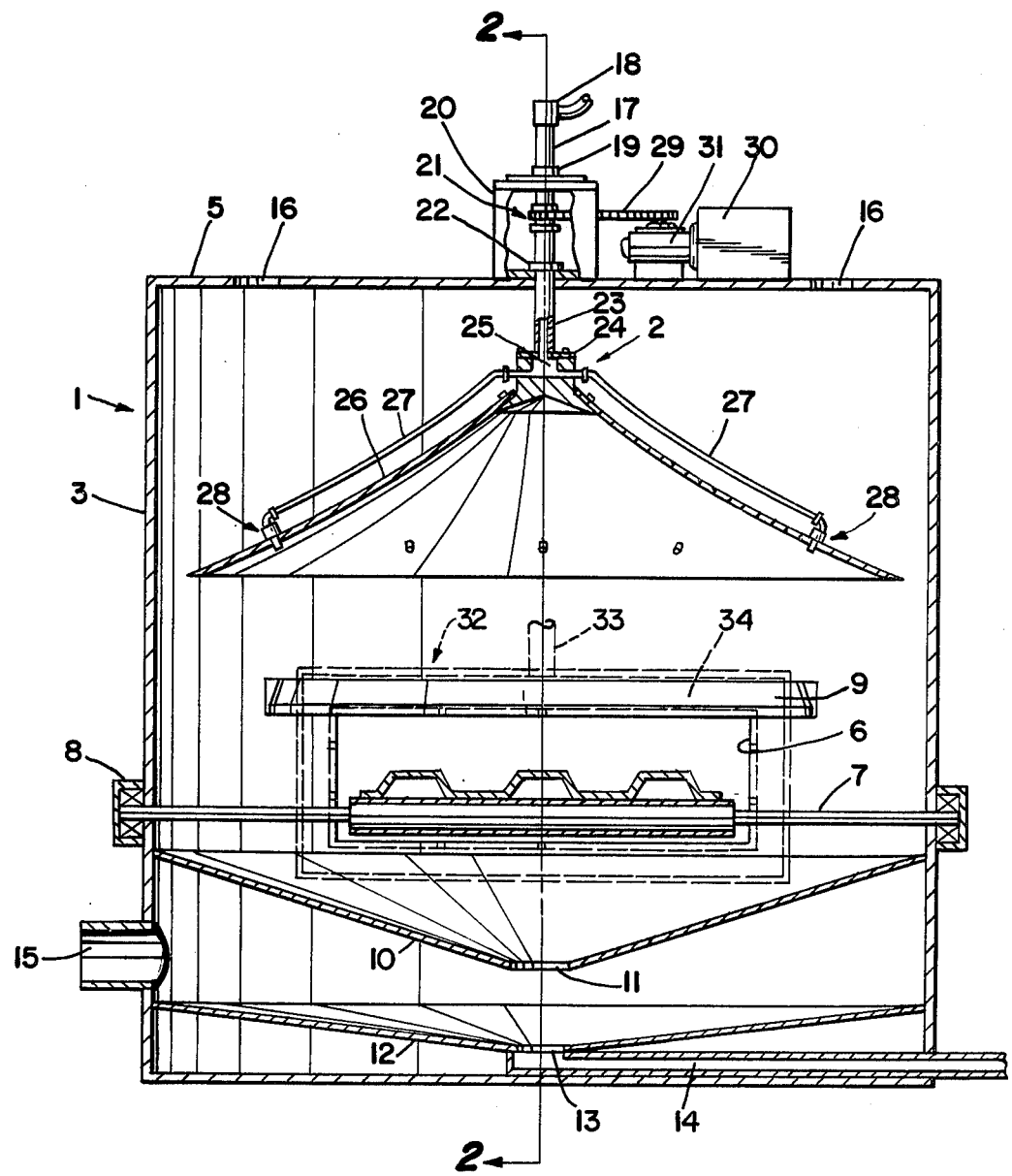
FIG. 1 is a partially cross sectional view of a coater taken transverse to the direction of travel of a substrate through the coater.

As can be seen in FIGS. 1 and 2 the ceiling 26 extends into proximity with the cylindrical wall 3 of the coater. The nozzle/ceiling assembly 2 is centered on the substrate, and as can be seen in FIG. 1 the diameter of the outer rotating edge of the ceiling 26 is greater than the width of the substrate. Therefore coating material deposited on the ceiling 26 is assuredly thrown clear of the substrate.

A flange or lip 9 is secured to the wall 3 of the coater over each of the openings 6. As can be more readily seen in FIG. 2 this flange or lip 9 is angled upwardly from the wall 3 so as to form a trough over each opening. As can be seen in FIG. 1 this flange 9, and hence the trough, extends beyond each end of the opening 6. The trough overlaps the outer rotating edge of the ceiling 26 on its underside so that any coating material thrown off the ceiling 26 or deposited on the walls 3 over the opening 6 is diverted to the side of the opening 6 and hence to the side of the substrate located in the opening.

A funnel shaped floor 12 is provided with a drain hole 13 at the center. The drain hole 13 is connected to a drain pipe or duct 14. This drain pipe is in turn connected to a reservoir (not shown) to collect the coating material for recycling or disposal as the user desires.

As coating material is sprayed from the nozzle 28, the solvent and other volatile parts of the coating material evaporate. Therefore exhaust means are provided to prevent the uncontrolled escape of this vapor and airborne coating material droplets out of the openings 6 of the coater. Two exhaust means are provided, each with its own advantages and function.

As can be seen in FIG. 2, an exhaust manifold 32 surrounds each opening 6. The manifold is in the form of larger and smaller concentric shrouds with the edges between them closed by a plate 34 so as to create a chamber between them. A vent 33 is provided in the manifold and is connected to an exhaust fan and suitable filtering device (not shown). Holes 35 are distributed in the inner or smaller shroud section around the opening 6 to exhaust the vapors and air borne droplets into the manifold, out of the vent 33 and to the filtering device. Various types of exhaust fans and filtering devices are well known in the art and are not discussed in detail here.

A second exhaust system located below the substrate can optionally be operated with certain advantages. Structurally, the second exhaust system comprises an exhaust manifold formed between the lower funnel shaped floor 12 and an upper funnel shaped floor 10 which is sealed at its perimeter to the cylindrical side wall 3. As can be seen in FIG. 1, an exhaust vent 15 is provided in the wall 3 between the upper floor 10 and the lower floor 12. This exhaust vent 15 is also connected to suitable fan and filtering device. When this exhaust system is operated, holes 16 are provided in the roof 5. When this exhaust system is not operated, the holes 16 in the roof 5 are blocked. When operated, the exhaust system is adjusted to create a small amount of negative pressure in the coating chamber between the drip shield 26 and the upper floor 10. This small amount of negative pressure is effective to draw a small amount of air through the holes 16 in the roof 5 downwardly between the outer rotating edge of the drip shield 26 and cylindrical side wall 3. This small amount of downward air movement is enough to keep solvent vapors and airborne coating material droplets from permeating into the space between the ceiling 26 and the roof 5. This helps to keep that area as clean as possible. However, with this aspect of the system in operation the overall efficiency of the coater in recovering coating material not deposited on the substrates is reduced. More of the airborne coating material is removed from the chamber in the exhaust, and therefore is not available to run down into the drain duct 14 for recovery. Therefore operation of this aspect is determined by the user's desires. It should be noted that only a small flow of air is introduced into the coating chamber. Too much air would cause the coating material to dry on the interior surfaces of the coater.

Coaters in this configuration have been successfully operated having a rotating ceiling of 84 inches in diameter, utilizing airless spray coating guns, and with the ceiling rotating at 12-30 rpm.

It has been observed that at higher rotational speeds, the rotating ceiling 26 exhibits almost no tendency to collect liquid coating material at all. Only a powdery residue is deposited on the rotating ceiling. Although the exact mechanism of this reduced tendency of the ceiling to collect liquid coating material at higher rotational speeds may not be fully understood, it is believed that at the higher rotational speeds, a boundary layer of air is formed along the continuous surface of the rotating ceiling and creates air currents which direct the liquid coating material away from the surface of the rotating ceiling. This phenomena is deemed to be a desirable benefit of the above described coater structure which will enhance the operation of the coater in many applications.

Referring back now to FIG. 2, an alternative nozzle mounting arrangement is depicted by phantom lines extending from the nozzles 28. The phantom lines depict nozzle extensions connected to the nozzles 28. They can be connected to the nozzles 28 by means of swivel connectors to allow convenient adjustment of the position of the spray pattern produced. Because of the centrifugal forces produced by the rotation of the ceiling 26, the extension might in some cases be given an orientation which slopes upwardly from the axis of rotation. The centrifugal force at the outer extremities will cause any coating material deposited on the extensions to flow upward along the surface of the extension and thereafter onto the ceiling 26 where it will be thrown clear of the substrate. The amount of upward slope from the axis of rotation will be limited by the rate of rotation of the ceiling 26. At higher rates of rotation, there will be a higher centrifugal force to compel the coating material upward along the extension. Therefore, the upward slope tolerable increases with an increase of the rate of rotation.

It may be noted that in the preferred embodiment the ceiling 26 constituted a rotating structure having an underside surface which is a continuous surface of revolution. In an alternative embodiment of this invention the ceiling 26 could be made stationary but with a constant slope over the substrate. In such a case the slope of the underside surface of the ceiling would be great enough to cause coating material to flow along its underside surface due to gravity in conjunction with the wetting action of the coating material holding it to the surface. In such a case the nozzles 28 could be supported by a rotating "spider" structure having individual arms radiating from the axis of rotation to support individual nozzles. These individual arms would slope downwardly from the axis of rotation of the support assembly in the same manner as the rotating ceiling 26 in the preferred embodiment.

Although a preferred embodiment and several modifications of my invention are described herein, it will be appreciated by those skilled in the art that certain aspects of this invention are susceptible to modifications and also applicable to other types of spray coating applications without departing from the scope of my invention.

Having described my invention I claim:

1. A coater comprising:
   a coating chamber adapted to have a substrate conveyed through it, said coating chamber comprising a side wall portion, a bottom portion and a ceiling portion;
   entrance and exit openings for a substrate to pass into and out of said chamber;
   a plurality of spray coating nozzles disposed generally within the ceiling portion and directed generally at an area where a substrate is coated;
   troughs on the side walls above said entrance and exit openings for the entire horizontal length of said openings; and
   wherein said ceiling is adapted to rotate about an axis, has a generally horizontally oriented outer spinning edge portion and is disposed above the area where the substrate is coated, and said ceiling further having a continuous underside surface which slopes downwardly from said axis;
   whereby liquid coating material collecting on said ceiling flows downwardly thereon and due to centrifugal forces is flung outwardly from the edge and clear of the substrate.

2. The coater of claim 1 wherein the slope of the underside of the ceiling diminishes in relation to an increase in the radial distance from the axis of rotation.

3. The coater of claim 1 wherein the spray coating nozzles are mounted on said ceiling.

4. The coater of claim 3 wherein the slope of the underside of the ceiling diminishes in relation to an increase in the radial distance from the axis of rotation.

5. The coater of claim 1 which further comprises exhaust means to exhaust air-borne spray particles and any excess vapor resulting from vaporizing coating solvent.

6. The coater of claim 5 which further comprises a roof portion having vent hole means;
   wherein said side walls are cylindrical and the outer spinning edge of said ceiling is circular and extends around its circumference into proximity with said side walls; and
   wherein said exhaust means draws vapors from the lower portion of said coating chamber to such an extent that a small amount of air is drawn downwardly from said vent hole means around the spinning edge of said ceiling.

7. The coater of claim 5 wherein the slope of the underside of the ceiling diminishes in relation to an increase in the radial distance from the axis of rotation.

8. The coater of claim 5 wherein the spray coating nozzles are mounted on said ceiling.

9. The coater of claim 8 wherein the slope of the underside of the ceiling diminishes in relation to an increase in the radial distance from the axis of rotation.

10. The coater of claim 9 wherein the outer rotating edge of said ceiling is larger in diameter than the width of substrates to be coated; and wherein
    said troughs overlap the periphera of the underside of said ceiling.

11. A coater comprising:
    a coating chamber having entrance and exit opening for substances to pass through said chamber:
    a spray coating means in said chamber to coat substrates passing through the chamber;
    means disposed over the spray coating means and the substrate path in said coating chamber to prevent dripping of oversprayed coating material onto any substrate in said coating chamber;
    said drip preventing means comprising a horizontally oriented, downwardly and outwardly sloping support means operatively associated with said spray means; and
    means to impart sufficient rotation to said support means whereby liquid coating material and vapors collecting on said support means flow downwardly thereon and due to centrifugal forces is flung outwardly of the edge of the support means and clear of said substrate.

12. A coater comprising:
    a coating chamber adapted to have a substrate conveyed through it, said coating chamber comprising a side wall portion, a bottom portion and a downwardly and outwardly flared ceiling portion;

entrance and exit openings for a substrate to pass into and out of said chamber;

a plurality of spray coating nozzles directed generally at an area where a substrate is coated;

means to prevent dripping from the area of the side walls located vertically over said openings; and wherein said ceiling is adapted to rotate about an axis, has a generally horizontally oriented outer spinning edge portion and is disposed above the area where the substrate is coated, and said ceiling further having a continuous underside surface which slopes downwardly from said axis;

whereby liquid coating material and vapor collecting on said ceiling flows downwardly thereon and due to centrifugal forces is flung outwardly from the edge thereof and clear of said substrate.

13. A coater comprising;

a coating chamber comprising a side wall portion, a ceiling portion and a bottom portion wherein said underside of said ceiling portion slopes enough to cause coating material deposited thereon to flow without dripping along its underside surface off to the side of any substrate passing therethrough;

entrance and exit openings for a substrate to pass into and out of said coating chamber;

a nozzle support assembly adapted for rotation about an axis and disposed vertically above the path of said substrate in said coating chamber, said nozzle support structure sloping downwardly and outwardly from said axis;

spray coating nozzles mounted on said nozzle support assembly;

means to prevent dripping from the area of the side walls located vertically over said openings; and means to rotate said nozzle support assembly whereby, due to centrifugal forces, liquid coating material deposited thereon is flung outwardly from the peripheral edge of the rotating support assembly.

14. The coater of claim 13 wherein said nozzle support structure comprises a plurality of individual arms radiating from said axis.

15. The coater of claim 13 wherein said nozzle support structure also comprises said ceiling.

* * * * *